US012722105B2

(12) United States Patent
Wong et al.

(10) Patent No.: US 12,722,105 B2
(45) Date of Patent: Sep. 1, 2026

(54) TWO STAGE FILTER CARTRIDGE WITH AN EXPANDABLE FRAME FACILITATING REPLACEMENT OF THE FILTER MEDIA

(71) Applicant: NANODOCKS TECHNOLOGY LIMITED, Hong Kong (CN)

(72) Inventors: Siu Wah Wong, Hong Kong (CN); Sau Yee Chau, Hong Kong (CN); Ka Shun Ng, Hong Kong (CN)

(73) Assignee: NANODOCKS TECHNOLOGY LIMITED, Hong Kong (CN)

( * ) Notice: Subject to any disclaimer, the term of this patent is extended or adjusted under 35 U.S.C. 154(b) by 475 days.

(21) Appl. No.: 18/522,916

(22) Filed: Nov. 29, 2023

(65) Prior Publication Data

US 2024/0278151 A1 Aug. 22, 2024

(30) Foreign Application Priority Data

Feb. 17, 2023 (CN) ........................ 202320250861.X
Mar. 6, 2023 (WO) .................. PCT/IB2023/052057

(51) Int. Cl.
*B01D 29/23* (2006.01)
*B01D 29/58* (2006.01)
*B01D 39/16* (2006.01)

(52) U.S. Cl.
CPC ............. *B01D 29/23* (2013.01); *B01D 29/58* (2013.01); *B01D 39/1623* (2013.01); *B01D 2201/0415* (2013.01); *B01D 2201/325* (2013.01); *B01D 2239/025* (2013.01); *B01D 2239/1216* (2013.01)

(58) Field of Classification Search
None
See application file for complete search history.

(56) References Cited

U.S. PATENT DOCUMENTS 828,714 A * 8/1906 Cook .................... E21B 43/088 166/231
937,861 A * 10/1909 Prinz ................. B29C 45/14549 29/896.61
1,322,378 A * 11/1919 Vaughan ............... B01D 29/111 210/485
1,546,528 A * 7/1925 Westphal ............. E21B 43/088 29/896.61
1,763,996 A * 6/1930 Willers ................... B21F 27/12 29/896.61
1,858,592 A * 5/1932 Johnson ................ E21B 43/088 209/393
1,950,202 A * 3/1934 Willers ................. E21B 43/088 166/231

(Continued)

FOREIGN PATENT DOCUMENTS

EP 4417289 B1 * 3/2026 ......... B01D 39/1623
GB 2276096 B * 10/1996 ............. B01D 29/19

*Primary Examiner* — Robert J Popovics

(74) *Attorney, Agent, or Firm* — WPAT, PC

(57) ABSTRACT

The present invention is related to a liquid filter having a filtration part for filtration of liquid, said filtration part at least comprising a first filtration layer consisting of a first material; and a second filtration layer consisting of a second material, characterized in that the filtration of liquid in the filtration part is in the order of: a first filtration, taking place at said second filtration layer; and a second filtration, taking place at said first filtration layer. The present invention is further related to a method for installing the liquid filter.

9 Claims, 9 Drawing Sheets

(56) References Cited

U.S. PATENT DOCUMENTS 2,046,459 A * 7/1936 Johnson ................ E21B 43/088 209/393
2,057,814 A * 10/1936 Barrett .................. B01D 29/19 210/457
2,084,433 A * 6/1937 Chorlton ............ B01D 29/6415 210/497.1
2,463,723 A * 3/1949 Spraragen ............. F02M 35/08 55/482
2,689,048 A * 9/1954 Powers .................. B01D 35/30 210/457
2,742,158 A * 4/1956 Schuller ................. B01D 29/52 210/345
2,838,179 A * 6/1958 Thomas .................... B03C 1/28 210/222
2,970,699 A * 2/1961 Leuthesser ............. B01D 29/21 210/493.1
2,988,227 A * 6/1961 Harms ................. B01D 29/668 210/493.2
3,043,739 A * 7/1962 Giles ..................... B01D 29/111 210/493.1
3,115,459 A * 12/1963 Giesse ................. B01D 17/045 210/485
3,189,179 A * 6/1965 Mcmichael ............ B01D 29/21 210/493.1
3,290,870 A * 12/1966 Jensen ................. F02M 35/024 55/486
3,291,310 A * 12/1966 Marvel .................. B01D 29/21 210/167.13
3,302,796 A * 2/1967 Downey ................ B01D 27/06 96/414
3,310,177 A * 3/1967 Briggs ................... B01D 29/21 210/457
3,321,088 A * 5/1967 Williamitis ............ B01D 29/21 55/498
3,326,382 A * 6/1967 Bozek .................... B01D 29/66 210/489
3,334,752 A * 8/1967 Matravers .............. B01D 29/58 210/489
3,334,753 A * 8/1967 Royer .................... B01D 27/06 210/493.1
3,368,687 A * 2/1968 Ruschman ............. B01D 29/58 210/493.1
3,385,038 A * 5/1968 Davis ..................... B01D 46/24 210/493.1
3,486,626 A * 12/1969 Close .................... B01D 29/111 55/501
3,498,464 A * 3/1970 Enosolone ............. B01D 29/96 210/493.1
3,552,553 A * 1/1971 Reading ................. B01D 29/15 210/493.1
3,584,685 A * 6/1971 Boyd .................... B01D 29/111 210/497.1
3,656,627 A * 4/1972 Briggs ................... B01D 29/21 210/488
3,667,615 A * 6/1972 Likness ................ B01D 29/111 228/904
3,849,309 A * 11/1974 Morris ................... B01D 39/18 210/485
3,853,509 A * 12/1974 Leliaert .................. B01D 46/71 55/378
3,950,256 A * 4/1976 Read ..................... B01D 29/111 210/493.5
3,954,623 A * 5/1976 Hammer ................ B01D 35/00 215/261
4,075,106 A * 2/1978 Yamazaki .............. B01D 29/21 210/493.1
4,081,379 A * 3/1978 Smith .................... B01D 29/15 210/232
4,089,783 A * 5/1978 Holyoak ............... B01D 29/111 210/493.1
4,154,688 A * 5/1979 Pall ........................ B01D 29/21 210/493.1
4,155,841 A * 5/1979 Chupka .................. D21D 5/026 210/415
4,186,099 A * 1/1980 Henschel, Jr. ......... B01D 29/21 210/493.1
4,193,780 A * 3/1980 Cotton, Jr. ............ B01D 46/06 210/485
4,259,095 A * 3/1981 Johnson, Jr. ........... B01D 46/48 55/379
4,276,265 A * 6/1981 Gillespie ................ B01J 8/0214 55/494
4,290,790 A * 9/1981 Okubo ................... B01D 46/06 55/379
4,350,590 A * 9/1982 Robinson ................ B03C 5/024 210/243
4,443,346 A * 4/1984 Muller ................. B01D 29/668 210/791
4,473,472 A * 9/1984 Muller ................... B01D 29/92 210/458
4,488,966 A * 12/1984 Schaeffer ............... B01D 29/66 210/485
4,517,090 A * 5/1985 Kersten ................ B01D 29/232 264/250
4,547,950 A * 10/1985 Thompson ............. B01D 46/10 29/445
4,575,422 A * 3/1986 Zimmer ............... B01D 27/103 210/438
4,604,201 A * 8/1986 Muller ................... B01D 29/15 210/323.2
4,652,369 A * 3/1987 DePolo .................. B01D 29/21 210/356
4,657,079 A * 4/1987 Nagaoka ................ B01D 29/48 166/234
4,695,300 A * 9/1987 Takagi ................. B01D 46/522 55/486
4,732,678 A * 3/1988 Humbert, Jr. .......... B01D 27/06 210/493.1
4,746,339 A * 5/1988 Millard ............. B01D 46/0001 425/117
4,818,403 A * 4/1989 Nagaoka ............... E21B 43/088 210/488
4,878,930 A * 11/1989 Manniso ................ B01D 46/71 210/321.82
4,952,311 A * 8/1990 Lindtveit ............... B01D 29/33 210/493.5
4,954,255 A * 9/1990 Muller ................. B01D 46/523 55/501
5,013,438 A * 5/1991 Smith .................... B01D 29/21 55/497
5,015,375 A * 5/1991 Fleck ..................... B01D 24/08 210/450
5,028,323 A * 7/1991 Gould .................... B01D 29/52 210/450
5,190,161 A * 3/1993 Arai ....................... B01D 29/48 209/400
5,203,998 A * 4/1993 Benian ................... B01D 29/76 210/493.1
5,250,094 A * 10/1993 Chung .................. F01N 13/017 55/DIG. 30
5,279,731 A * 1/1994 Cook ..................... B01D 29/21 210/489
5,279,733 A * 1/1994 Heymans ............... B01D 29/96 210/485
5,306,332 A * 4/1994 Allen .................. B01D 46/521 55/498
5,468,382 A * 11/1995 Cook .................... B01D 29/111 210/489
5,510,029 A * 4/1996 Benian ................... B01D 29/76 210/411
5,567,323 A * 10/1996 Harrison, Jr. .......... B01D 29/15 210/DIG. 17
5,591,329 A * 1/1997 Davidson ............... B01D 29/21 210/493.1
5,611,831 A * 3/1997 Matsuoka .......... B01D 39/2017 55/501
5,639,369 A * 6/1997 Bowlsbey .............. B01D 29/15 210/497.2

(56) References Cited

U.S. PATENT DOCUMENTS 5,705,065 A * 1/1998 Sharpe ........ B01D 29/96 210/453
5,800,580 A * 9/1998 Feldt ........ B01D 46/06 55/378
5,807,415 A * 9/1998 Leo ........ B01D 46/02 210/232
5,858,039 A * 1/1999 Schumann ........ B01D 46/08 55/378
5,871,641 A * 2/1999 Davidson ........ B01D 29/21 210/167.13
5,882,528 A * 3/1999 Davidson ........ B01D 29/21 210/791
5,980,759 A * 11/1999 Proulx ........ B01D 29/58 210/493.4
6,041,944 A * 3/2000 Meier ........ B01D 29/925 210/489
6,391,197 B1 * 5/2002 Billiet ........ B01D 46/0004 210/232
6,422,396 B1 * 7/2002 Li ........ B01D 17/045 210/DIG. 5
6,478,959 B1 * 11/2002 Morgan ........ B01D 29/111 210/485
6,488,842 B2 * 12/2002 Nagaoka ........ B01D 29/58 210/411
6,488,846 B1 * 12/2002 Marangi ........ B01D 29/15 239/149
6,524,411 B2 * 2/2003 Pulek ........ B01D 29/21 156/303.1
6,524,479 B2 * 2/2003 Schwinghammer ... B01D 46/10 210/493.1
6,860,394 B1 * 3/2005 Mueller ........ B01D 29/66 210/489
6,962,256 B2 * 11/2005 Nguyen ........ B01D 27/06 210/493.1
6,986,842 B2 * 1/2006 Bortnik ........ B01D 46/4227 210/485
7,004,989 B2 * 2/2006 Karlsson ........ B01D 46/523 55/497
7,097,681 B2 * 8/2006 Kao ........ B01D 46/521 55/498
7,168,572 B2 * 1/2007 Nguyen ........ B01D 27/06 210/457
7,207,320 B2 * 4/2007 Ikeya ........ F02M 37/14 210/416.4
7,303,083 B2 * 12/2007 Le Men ........ B01D 29/232 210/485
D600,776 S * 9/2009 Hubbard ........ D23/209
7,661,540 B2 * 2/2010 Choi ........ B01D 46/523 55/482
7,757,865 B2 * 7/2010 Koves ........ B01J 8/008 209/400
7,828,870 B1 * 11/2010 Rech ........ B01D 46/521 55/498
7,896,940 B2 * 3/2011 Sundet ........ B01D 46/0001 55/497
7,998,353 B2 * 8/2011 Vandendijk ........ B01D 29/15 210/232
8,021,456 B2 * 9/2011 Gopakumar ....... B01D 46/0001 156/330.9
8,051,989 B1 * 11/2011 Tondreau ........ B01D 29/58 210/493.4
8,187,352 B2 * 5/2012 Schumann ........ B01D 46/08 55/378
8,225,940 B2 * 7/2012 Schmidt ........ B01D 39/1623 210/493.5
8,303,682 B2 * 11/2012 Nowak ........ B01D 46/06 95/1
8,366,922 B2 * 2/2013 McCague ........ C02F 1/001 210/167.13
8,431,021 B2 * 4/2013 McCague ........ C02F 1/001 210/167.13
8,465,654 B2 * 6/2013 Leonard ........ B01D 29/15 210/232
8,501,002 B2 * 8/2013 Knickmann ........ B01D 29/21 210/450
8,512,614 B2 * 8/2013 Diefenderfer ........ B29C 33/42 29/895.23
8,535,524 B2 * 9/2013 McCague ........ B01D 24/08 4/507
8,561,810 B2 * 10/2013 Tsai ........ C02F 1/441 210/485
9,221,003 B2 * 12/2015 Schumann ........ B01D 46/06
9,409,104 B2 * 8/2016 Pflueger ........ B01D 29/19
9,714,457 B2 * 7/2017 Denton ........ B01D 39/1623
9,770,685 B2 * 9/2017 Krueger ........ B01D 46/71
9,808,750 B2 * 11/2017 Klein ........ B01D 35/18
9,889,398 B2 * 2/2018 Campbell ........ F02M 35/02416
9,895,633 B2 * 2/2018 Levi ........ B01D 35/31
9,908,069 B2 * 3/2018 Galifi ........ B01D 46/0001
9,968,875 B2 * 5/2018 Gabrielsson ........ B01D 35/28
10,035,713 B2 * 7/2018 Dani ........ C02F 1/283
10,040,019 B2 * 8/2018 Klein ........ B01D 46/58
10,125,027 B2 * 11/2018 Dani ........ C02F 1/002
10,272,368 B2 * 4/2019 Klein ........ B01D 29/071
10,307,701 B2 * 6/2019 Klein ........ B01D 46/4263
10,351,442 B2 * 7/2019 Dani ........ B01D 29/0097
10,441,904 B2 * 10/2019 Levi ........ B01D 29/21
10,479,697 B2 * 11/2019 Dani ........ B01D 29/15
D872,842 S * 1/2020 Griswold ........ D23/209
10,562,002 B2 * 2/2020 Maas ........ B01D 29/96
10,625,191 B2 * 4/2020 Campbell ........ F02M 35/02416
10,654,725 B2 * 5/2020 Dani ........ C02F 1/283
10,744,428 B2 * 8/2020 Wyhler ........ B01D 35/18
10,918,979 B2 * 2/2021 Medina ........ B01D 39/16
10,920,364 B2 * 2/2021 Choi ........ D06F 43/007
11,001,508 B2 * 5/2021 Dani ........ C02F 1/003
11,066,311 B2 * 7/2021 Dani ........ C02F 1/283
11,192,053 B2 * 12/2021 Campbell ........ B01D 46/2411
11,407,652 B2 * 8/2022 Dani ........ B01D 29/15
11,452,399 B1 * 9/2022 Murphy ........ A47J 19/005
11,478,731 B2 * 10/2022 Gabrielsson ........ D21G 9/00
11,524,252 B2 * 12/2022 Aquilina ........ E04H 4/1272
11,583,788 B1 * 2/2023 Kuepper ........ C02F 1/004
11,679,347 B2 * 6/2023 McFarlen ........ B01D 29/15 210/455
11,801,477 B2 * 10/2023 Banchieri ........ B01D 69/107
11,825,974 B1 * 11/2023 Murphy ........ A47J 19/005
D1,015,516 S * 2/2024 Lin ........ D23/365
11,975,275 B2 * 5/2024 Dam ........ B01D 29/07
12,036,512 B2 * 7/2024 Puglia ........ B01D 63/14
12,115,485 B2 * 10/2024 Currell ........ B01D 46/71
12,168,190 B2 * 12/2024 Stuiver ........ B01D 29/15
12,589,336 B1 * 3/2026 Kuepper ........ B01D 24/12
12,594,528 B2 * 4/2026 Puglia ........ B01D 63/14
12,599,853 B1 * 4/2026 Liu ........ B01D 29/13
2001/0010297 A1 * 8/2001 Pulek ........ B01D 29/111 210/493.2
2001/0025815 A1 * 10/2001 Schwinghammer ........ B01D 46/523 210/348
2002/0040870 A1 * 4/2002 Paul ........ B01D 29/96 210/437
2002/0074279 A1 * 6/2002 Van Pelt ........ B01D 29/21 210/493.1
2002/0166578 A1 * 11/2002 Leblond ........ B01D 41/04 134/140
2002/0179521 A1 * 12/2002 Paul ........ B01D 65/00 210/485
2003/0047503 A1 * 3/2003 Bortnik ........ B01D 29/21 210/493.1
2004/0025485 A1 * 2/2004 Lee ........ B01D 46/2414 55/486
2004/0134851 A1 * 7/2004 Lucas ........ B01D 67/0088 210/506
2004/0162203 A1 * 8/2004 Stoyell ........ B01D 29/111 493/42
2004/0206691 A1 * 10/2004 Charin ........ B01D 29/21 210/493.1

(56) References Cited

U.S. PATENT DOCUMENTS

2004/0250518 A1* 12/2004 Kao ........................ B01D 46/08 55/379
2005/0039427 A1* 2/2005 Karlsson ................ B01D 46/10 55/497
2005/0173325 A1* 8/2005 Klein ..................... B01D 27/06 210/206
2005/0211619 A1* 9/2005 Bortnik .............. B01D 46/2411 55/486
2006/0005517 A1* 1/2006 Sundet ............... B01D 46/0001 55/497
2006/0016745 A1* 1/2006 Nguyen ................. B01D 27/06 210/440
2006/0027492 A1* 2/2006 Lin ........................ B01D 29/15 210/451
2006/0048756 A1* 3/2006 Ikeya ..................... F02M 37/14 210/234
2006/0183619 A1* 8/2006 Stoyell ................... B01D 29/21 493/430
2007/0241045 A1* 10/2007 Kott .......................... C02F 1/42 210/450
2007/0251634 A1* 11/2007 Choi .................. B01D 46/2411 156/204
2008/0060328 A1* 3/2008 Devine ................ B01D 46/521 55/486
2008/0272048 A1* 11/2008 Mei .................... B01D 46/2411 210/493.2
2009/0152190 A1* 6/2009 Schmidt ............... B01D 29/232 210/493.5
2009/0183633 A1* 7/2009 Schiller ............. B01D 46/2411 55/289
2009/0200227 A1* 8/2009 Sakamoto ............ B01D 29/232 210/485
2009/0283481 A1* 11/2009 Vandendijk ............ B01D 29/15 210/232
2010/0089813 A1* 4/2010 Tellier .................. B01D 24/004 210/236
2010/0126130 A1* 5/2010 Gopakumar ......... B01D 46/523 55/498
2010/0314308 A1* 12/2010 Pflueger ................. B01D 29/19 210/356
2011/0006015 A1* 1/2011 Leonard ................. B01D 29/15 210/489
2011/0062065 A1* 3/2011 McCague ............ B01D 24/042 210/167.1
2011/0062066 A1* 3/2011 McCague ............ B01D 24/042 210/167.1
2011/0067370 A1* 3/2011 Schumann ............. B01D 46/08 55/492
2011/0120925 A1* 5/2011 McCague ............... C02F 1/001 210/167.1
2011/0138760 A1* 6/2011 Sundet ................. B01D 46/523 55/486
2011/0147321 A1* 6/2011 Oz ........................ B01D 24/08 210/287
2012/0324842 A1* 12/2012 Schumann ............. B01D 46/08 55/303
2013/0220918 A1* 8/2013 Ishikura ................. B01D 29/58 210/489
2014/0131270 A1* 5/2014 Zeiler .................... B01D 63/14 210/493.1
2014/0158607 A1* 6/2014 Xia ........................ B01D 35/31 210/435
2014/0197093 A1* 7/2014 Gabrielsson ........... B01D 35/28 210/485
2014/0230388 A1* 8/2014 Hio ........................ B01D 29/07 210/493.1
2014/0311963 A1* 10/2014 Bortnik .................. B01D 27/06 210/489
2014/0326683 A1* 11/2014 Kathan ................ B01D 17/045 210/519
2014/0353229 A1* 12/2014 Klein ................... F02M 31/125 29/428
2015/0251122 A1* 9/2015 Campbell ............. B01D 46/02 55/497
2015/0298039 A1* 10/2015 Campbell ........ F02M 35/02416 55/482
2015/0375148 A1* 12/2015 Klein ................... B01D 46/521 210/186
2016/0023133 A1* 1/2016 Sasur ................. B01D 46/0015 156/60
2016/0144303 A1* 5/2016 Tanida ................. B01D 33/073 210/493.2
2016/0167980 A1* 6/2016 Dani ....................... C02F 1/283 210/466
2016/0193552 A1* 7/2016 Levi ....................... B01D 29/21 210/493.5
2016/0250573 A1* 9/2016 Hawes ................. B01D 29/353 210/454
2016/0263495 A1* 9/2016 Wyhler .................. B01D 29/15
2016/0271532 A1* 9/2016 Kanazawa ............. C02F 1/444
2016/0376161 A1* 12/2016 Dani ....................... C02F 1/003 210/660
2016/0376162 A1* 12/2016 Dani ....................... C02F 1/002 210/266
2016/0376163 A1* 12/2016 Dani ....................... C02F 1/003 210/419
2016/0376164 A1* 12/2016 Dani ....................... C02F 1/003 210/444
2016/0376165 A1* 12/2016 Dani ....................... C02F 1/003 210/444
2017/0001880 A1* 1/2017 Dani ...................... B01D 35/30
2017/0056792 A1* 3/2017 Klein ................... B01D 35/147
2017/0217557 A1* 8/2017 Yahagi ................. B01D 33/073
2017/0326484 A1* 11/2017 Bortnik ............. B01D 17/0208
2018/0071967 A1* 3/2018 Schröder ............... B29C 48/503
2018/0133626 A1* 5/2018 Levi ....................... B01D 29/21
2018/0140983 A1* 5/2018 Yahagi ..................... B63J 4/002
2018/0214800 A1* 8/2018 Gabrielsson ............. D21D 5/04
2018/0214807 A1* 8/2018 Campbell .......... F02M 35/0216
2019/0060788 A1* 2/2019 Hampton ............... B01D 29/13
2019/0070531 A1* 3/2019 Medina .................. B01D 29/21
2019/0282964 A1* 9/2019 Puglia .................... B01D 63/14
2020/0086242 A1* 3/2020 Mcfarlen ............... B01D 29/15
2020/0208333 A1* 7/2020 Choi ..................... D06F 43/007
2020/0330905 A1* 10/2020 Dam ...................... B01D 29/56
2020/0384388 A1* 12/2020 Stuiver .................. B01D 29/52
2021/0039022 A1* 2/2021 Aquilina ............... E04H 4/1272
2021/0331007 A1* 10/2021 Cresswell .............. B01D 46/52
2022/0233978 A1* 7/2022 Stuiver .................. B01D 29/66
2023/0226470 A1* 7/2023 Strasser ................. B01D 29/66 210/798
2023/0226479 A1* 7/2023 Strasser ............ B01D 46/2407 55/350.1
2023/0271114 A1* 8/2023 Dam ...................... B01D 29/56 210/489
2024/0216846 A1* 7/2024 ter Horst ............ B01D 46/0001
2024/0252971 A1* 8/2024 Brubaker ............. B01D 46/521
2024/0278151 A1* 8/2024 Wong ..................... B01D 29/23
2024/0325983 A1* 10/2024 Puglia .................... B01D 63/14
2025/0065251 A1* 2/2025 Stuiver .................. B01D 29/52

* cited by examiner

TWO STAGE FILTER CARTRIDGE WITH AN EXPANDABLE FRAME FACILITATING REPLACEMENT OF THE FILTER MEDIA

FIELD OF THE INVENTION

The present invention relates to a liquid filter and a method for installing its filtration part. In particular, the present invention relates to a filtration material at least comprising nanofiber and activated carbon as a filtration part of a water filter, and a method for installing its filtration part.

BACKGROUND OF THE INVENTION

For water filters available in the market, of which the filtration parts for filtration generally comprise a layer of filtration material with different sizes of filtration pores to filter impurities of different particle sizes. However, the filtration performance of these filtration parts is not only average, but also greatly reduced when impurities of larger particles are filtered and block the larger filtration pores of the filtration material. Moreover, the flow rate of liquid in the water filter will be greatly impaired during filtration. When the smaller filtration pores of the filtration material are not fully used, the filtration material has been replaced. In addition to failing to make the best use of the filter material and not in line with economic benefits, this action also imposes a burden on the environment.

Therefore, the present invention provides a water filter comprising at least two filtration layers, these layers include a nanofiber filtration layer and an activated carbon filtration layer. The present invention further provides a method for installing said at least two filtration layers, providing convenience for users to replace the filtration part. It at least provides the public with an alternative.

SUMMARY OF THE INVENTION

The first aspect of the present invention is related to a liquid filter, having a filtration part for filtration of liquid, said filtration part at least comprising: a first filtration layer consisting of a first material; and a second filtration layer consisting of a second material, wherein the filtration of liquid in the filtration part is in the order of: a first filtration, taking place at said second filtration layer; and a second filtration, taking place at said first filtration layer.

In one embodiment, said filtration part having a channel for liquid flow, said first filtration layer and said second filtration layer are provided along the length of said channel, wherein said second filtration layer is closer to said channel than said first filtration layer, wherein, the flow direction of liquid in said filtration part is in the order of: said channel, said second filtration layer, and said first filtration layer. Preferably, said first filtration layer and said second filtration layer can be independently assembled to form said filtration part.

In one embodiment, said first material is nanofiber selected from nylon, n-polyacrylonitrile, polyurethane, or the combinations thereof. Preferably, that said second material is activated carbon. More preferably, the pore size of said first filtration layer is smaller than the pore size of said second filtration layer.

The second aspect of the present invention is related to a liquid filter, having a filtration part for filtration of liquid, said filtration part at least comprising: a first filtration layer consisting of a first material; a second filtration layer consisting of a second material; and a third filtration layer consisting of a third material, wherein the filtration of liquid in said filtration part is in the order of: a first filtration, taking place at said third filtration layer; a second filtration, taking place at said second filtration layer; and a third filtration, taking place at said first filtration layer.

In one embodiment, said filtration part having a channel for liquid flow, said first filtration layer, said second filtration layer, and said third filtration layer are provided along the length of said channel, wherein said third filtration layer is the closest to said channel, said first filtration layer is the farthest from said channel, said second filtration layer is positioned between said first filtration layer and said third filtration layer, wherein, the flow direction of liquid in said filtration part is in the order of: said channel, said third filtration layer, said second filtration layer, and said first filtration layer. Preferably, said first filtration layer, said second filtration layer, and said third filtration layer can be independently assembled to form said filtration part.

In one embodiment, said first material is nanofiber selected from nylon, n-polyacrylonitrile, polyurethane, or the combinations thereof; said second material is activated carbon; and said third material is non-woven fabric. Preferably, the material of said non-woven fabric is selectable from polyethylene non-woven fabric, polypropylene non-woven fabric, spunbonded non-woven fabric, melt-blown non-woven fabric, or spunlaced non-woven fabric. In one embodiment, the pore size of said third filtration layer is larger than the pore size of said second filtration layer, and the pore size of said second filtration layer is larger than the pore size of said first filtration layer. In one embodiment, the pore size of said third filtration layer is the same as the pore size of said second filtration layer and larger than the pore size of said first filtration layer.

In one embodiment, said liquid filter is provided with a frame, allowing said filtration part to be arranged along the length of said frame. Preferably, said first filtration layer is flexible, said second filtration layer is a prefabricated member, said first filtration layer being positioned between said second filtration layer and said frame. More preferably, the outer circumferential cross-section of said second filtration layer having a first geometric shape. In one embodiment, said first geometric shape is polygon-shaped. In another embodiment, said first geometric shape is star-shaped or wave-shaped.

In one embodiment, the inner circumferential cross-section of said frame having a second geometric shape, after said first filtration layer being arranged along the length of said frame, the cross-section of said first filtration layer assumes said first geometric shape and/or said second geometric shape. Preferably, said second geometric shape is polygon-shaped. More preferably, said second geometric shape is star-shaped or wave-shaped. In another embodiment, said first geometric shape is the same as said second geometric shape.

In one embodiment, said frame having a bottom part and a plurality of branches extending upward along its length from said bottom part, wherein each of said plurality of branches has a first end engaging with said bottom part and a second end opposite said first end. In particular, said plurality of branches of said frame extending upwards away from the central axis of said bottom part of said frame. Preferably, said first geometric shape having a recessed portion positioned corresponding to said plurality of branches of said frame. More preferably, after said first filtration layer being arranged along the length of said frame, the cross-section of said first filtration layer assumes said first geometric shape.

The third aspect of the present invention is related a method for installing a filtration part of the present invention, providing a convenient way for users to replace the filtration part. The method comprises the following steps: (i) providing a water inlet, a base member, said frame, a first filtration layer, and a second filtration layer; (ii) surrounding said first filtration layer along the length of said second filtration layer around the periphery of said second filtration layer to form a first assembly; (iii) surrounding said frame along the length of said first assembly around the periphery of said first assembly to form a second assembly; (iv) assembling said second assembly with said water inlet and said base member, wherein said second assembly is positioned between said water inlet and said base member.

In one embodiment, the method also includes the following steps in step (i): providing a third filtration layer inner-circumferentially to the central part of said second filtration layer.

In one embodiment, said first filtration layer is flexible, and said second filtration layer is a prefabricated member, in particular a rigid prefabricated member.

In one embodiment, said frame is a plurality of branches, having a first end and a second end opposite to said first end, said first end can be operationally connected to said base member, thereby said plurality of branches extending upward along its length from said base member. Preferably, said plurality of branches extending upwards away from the central axis of said base member. More preferably, the outer circumferential cross-section of said second filtration layer having a first geometric shape having a recessed portion positioned corresponding to the position of said plurality of branches of said frame.

DESCRIPTION OF THE DRAWINGS

The present invention provides the following drawings, which are intended to introduce various embodiments of the present invention in detail and are not intended to limit the present invention, wherein.

Figure 7:
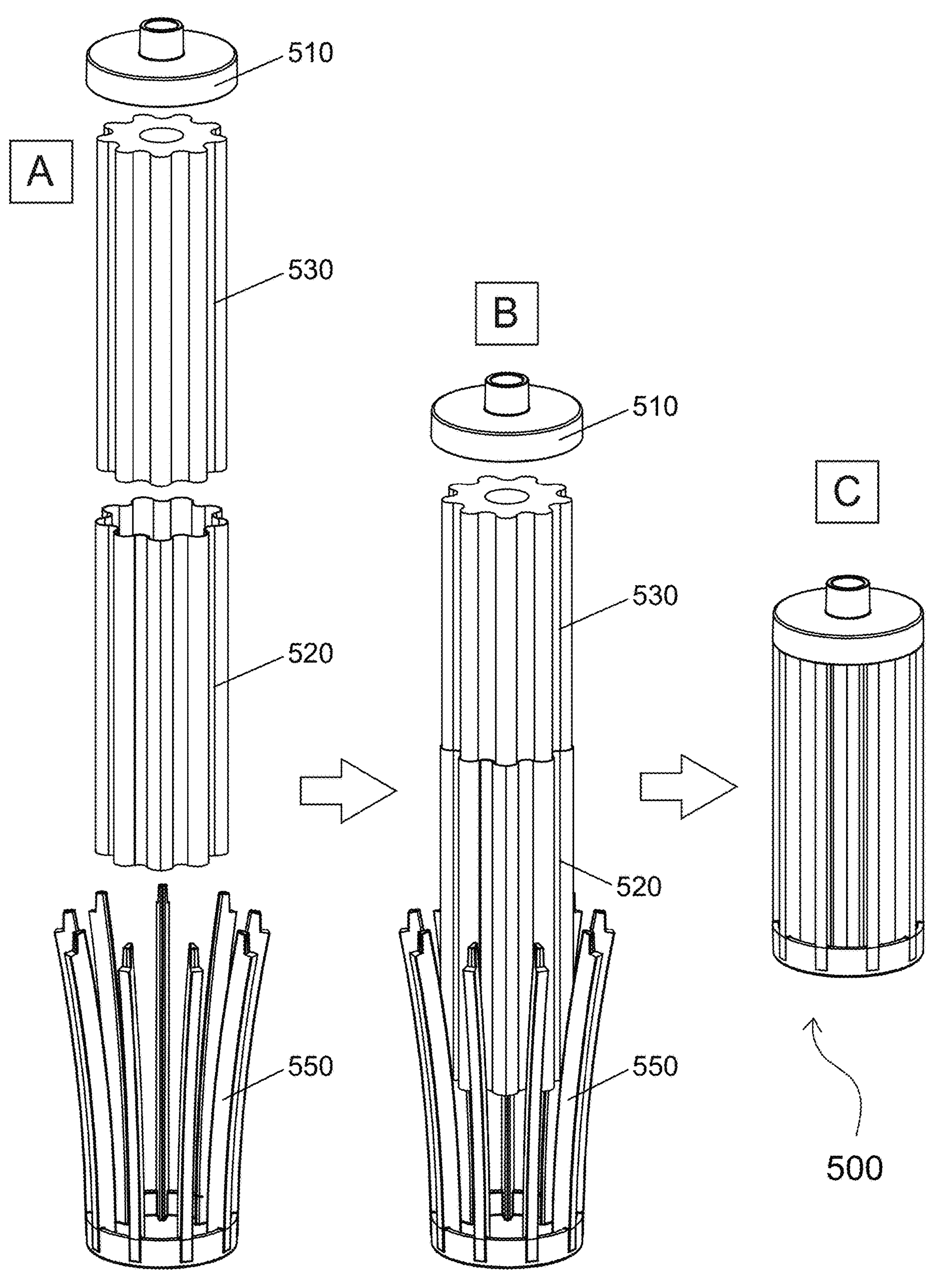
Figure 8:
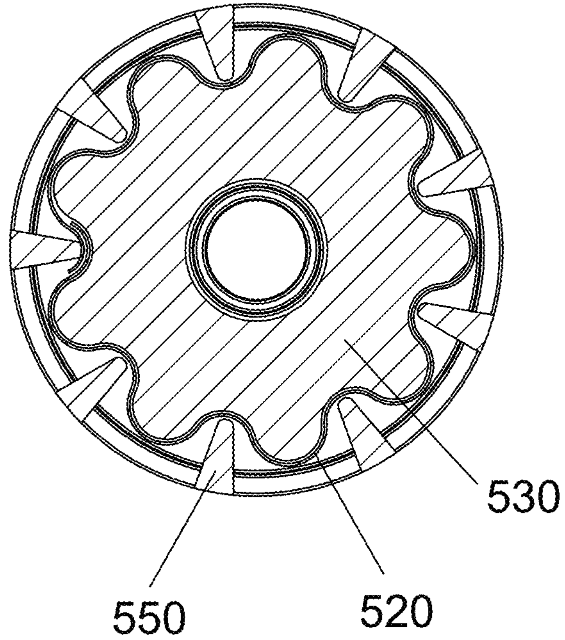

Inserts A to C in FIG. 7 are assembly schematic diagrams according to another embodiment of the present invention, representing the assembly between the first filter layer, the second filter layer, and the frame;

FIG. 8 is a top view of the embodiment of FIG. 7; and

Figure 9:
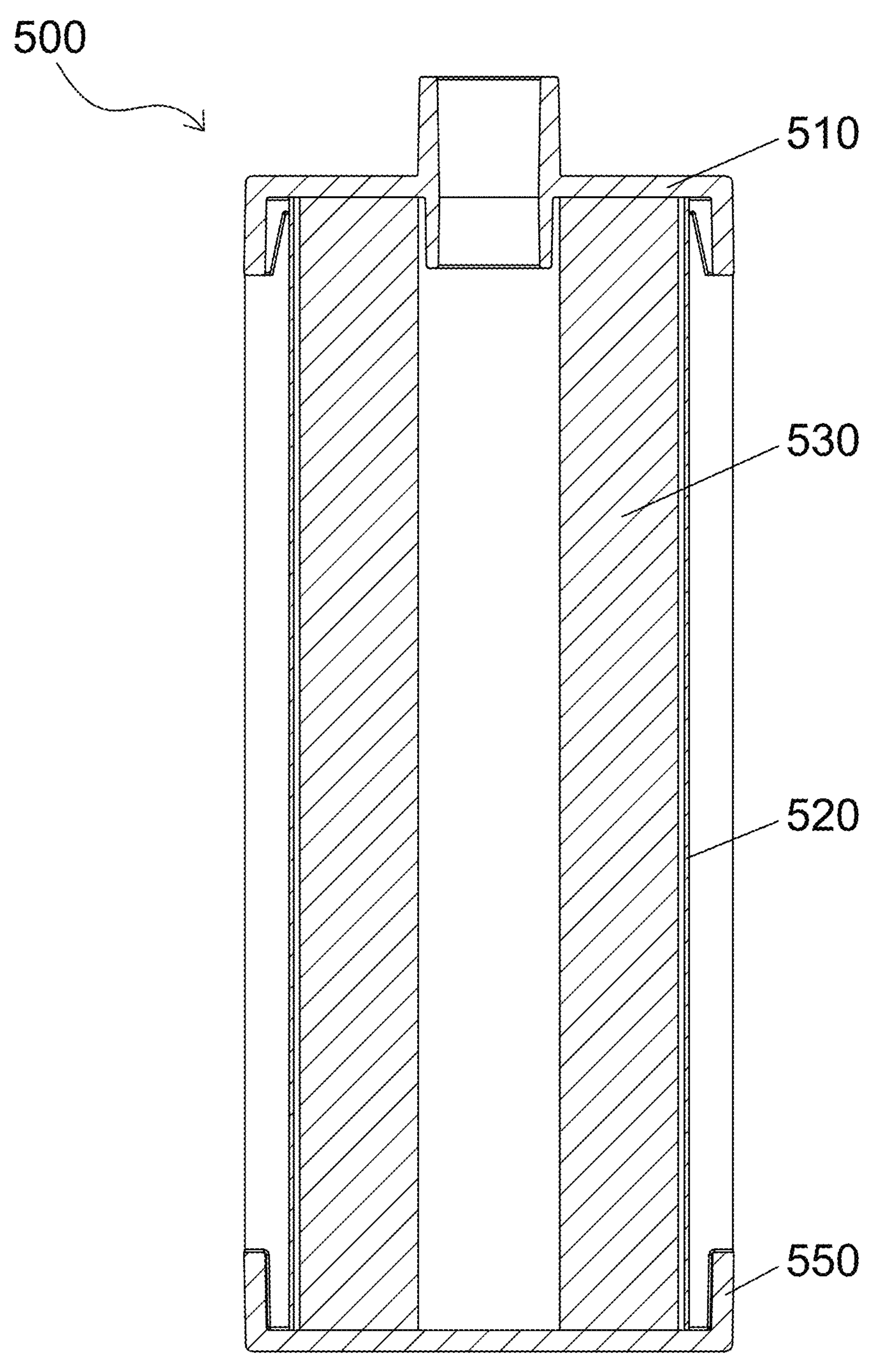

FIG. 9 is a cross-sectional view of the filtration part of the embodiment of FIG. 7.

DETAILED DESCRIPTION OF PREFERRED EMBODIMENTS OF THE INVENTION

In order to make the purpose, technical solution, and advantages of the present invention clearer, the following is a detailed explanation of the present invention in conjunction with specific embodiments and with reference to the accompanying drawings.

It shall be noted that, the technical or scientific terms used in the embodiments of the present invention shall have the general meanings understood by those skilled in the art to which the present invention belongs. "First", "second" and similar expression used in the embodiments of the present invention do not indicate any quantity or importance. Terms such as "front", "back", "left", "right", "up", and "down" indicating orientation or similar terms are only described for the exemplary relative position relationship shown in the accompanying drawings for the convenience of those skilled in the art to understand, and are not limited to the specific relative position relationship within the present invention.

The liquid filter of the present invention has a filtration part for liquid filtration. The liquid filter at least further comprises a water inlet and a filtered liquid collector. It can be understood that the water inlet is for unfiltered liquid to flow to the filtration part of the present invention for filtering, and the liquid filtered by the liquid filter of the present invention flows to the filtered liquid collector for use/to be used. For the sake of brevity, unless otherwise specified, the description and drawings will not provide detailed description on filters, water inlets, and filtered liquid collectors. Those skilled in the art should be aware of and use known methods or techniques to assemble the filters, water inlets, and filtered liquid collectors. For exemplary purposes, this description takes water as an example of liquid that needs to be filtered. However, the filtered liquid to which the present invention is applicable should not be limited to water.

Figure 1:
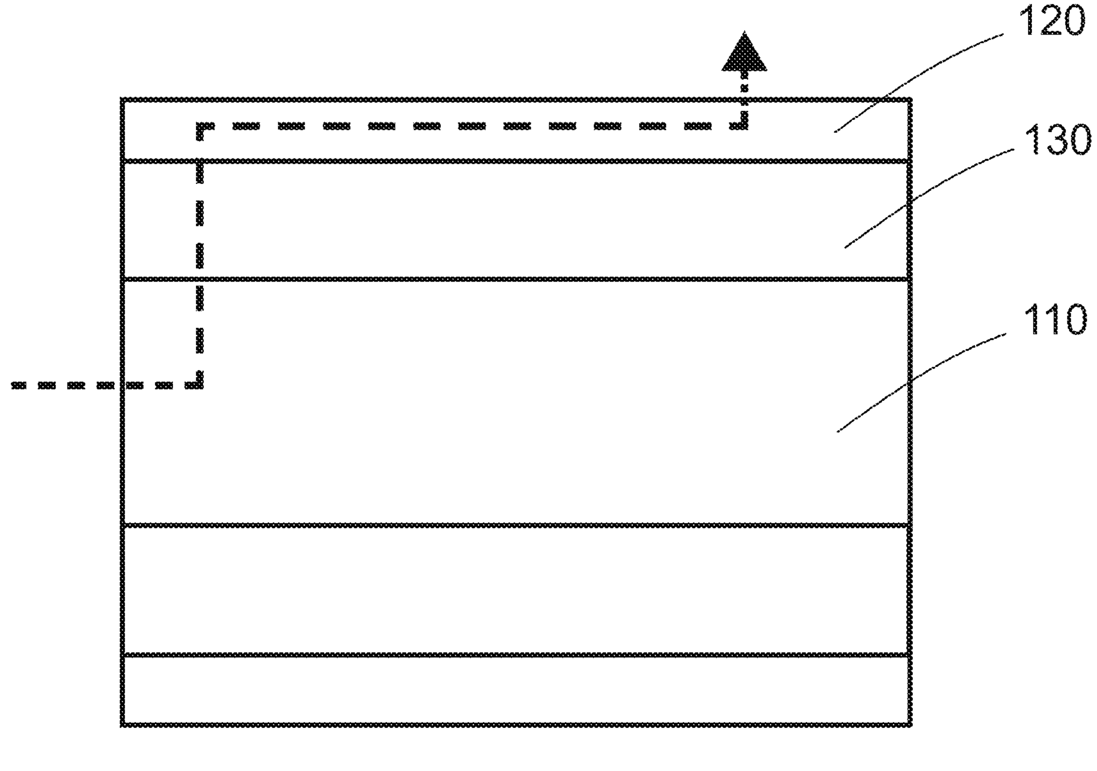
FIG. 1 is a cross-sectional view of a filtration part according to an embodiment of the present invention.
Figure 1:
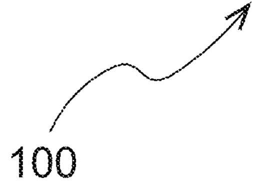

FIG. 1 shows a first embodiment of the filtration part of the liquid filter of the present invention. The filtration part 100 shown in FIG. 1 assumes cylindrical or tubular in shape. The filtration part 100 includes a channel 110, a first filtration layer 120, and a second filtration layer 130. The first filtration layer 120 and the second filtration layer 130 are constructed and manufactured so that they respectively have porous structures, wherein the pore size of the first filtration layer 120 is smaller than the pore size of the second filtration layer 130. The second filtration layer 130 is closer to the channel 110 than the first filtration layer 120. The first filtration layer 120 and the second filtration layer 130 can be independently assembled to form the filtration part 100. This means that users can selectively replace the first filtration layer 120 and/or the second filtration layer 130 according to needs.

The materials of the first filtration layer 120 include nanofiber, which can be selected from nylon, n-polyacrylonitrile, polyurethane, or the combinations thereof. Nanofibers made from polymers are well-known in this field, which is not described in details in the description. Due to the interweaving of nanofibers, the material has a porous structure. Therefore, the first filtration layer 120 according to the present invention can be configured to filter impurities of several sizes in the liquid. The materials of the second filtration layer 130 include activated carbon. Preferably, the activated carbon of the second filtration layer 130 can be in the forms of granules, rods, strips, sheets, etc. according to actual needs. Due to its porosity, it can adsorb microscopic substances in various liquids when filtering, which is commonly used in water treatment for decolorization, deodorization, dechlorination, and removal of organic matter and heavy metals. The principle and application of using activated carbon for filtering are well-known in this field, thus it is not described in details in the description. The above examples are only exemplary examples and shall not be understood as limitations to the present invention. The spirit of the present invention lies in the filtration part 100, the pore size of the first filtration layer 120 is smaller than the pore size of the second filtration layer 130. According to actual needs, the example of the material of the second filtration layer 130 can also be used for the first filtration layer 120, and the example of the material of the first filtration layer 120 can also be used for the second filtration layer 130.

When implementing the first embodiment, as shown by the dashed line in FIG. 1, unfiltered liquid first enters the channel 110 from the left side of the filtration part and then enters the second filtration layer 130. The unfiltered liquid first undergoes a first filtration at the second filtration layer 130. The liquid after the first filtration then enters the first filtration layer 120 and the second filtration takes place at the first filtration layer 120. The liquid after the second filtration then leaves the filtration part and enters the filtered liquid collector. The configuration of this first embodiment defines the unique direction in which liquid flows outward from the center of the filtration part. Compared with the prior art, in the process of liquid filtration in this embodiment, the flow direction of liquid is different from that of similar filters in the prior art, in which the flow direction of liquid is from the peripheral part of its filtration part inward to the central channel.

Even if the direction of the liquid flows into the channel 110 is horizontal in the embodiment shown in FIG. 1, those skilled in the art should understand that the teachings in the embodiment shown in FIG. 1 does not limit to the present invention. According to actual needs, those skilled in the art could configure, according to the first embodiment of the present invention, the direction of the liquid flows into the channel 110 such as entering from the right, from the top, or from the bottom. The spirit of the present invention lies in that the unfiltered liquid first has a first filtration at the second filtration layer 130, and then the liquid after the first filtration has a second filtration at the first filtration layer 120.

Figure 2:
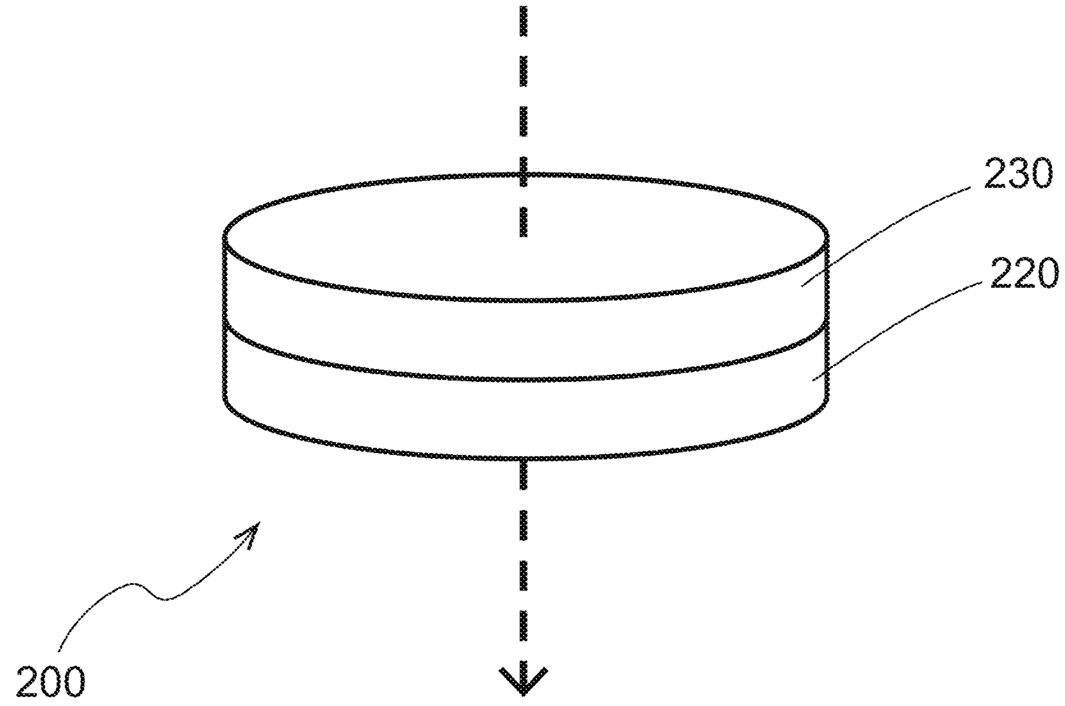
FIG. 2 is a perspective view of a filtration part according to an embodiment of the present invention.

FIG. 2 is the second embodiment of the filtration part of the filter of the present invention. The filtration part 200 shown in FIG. 2 is in a form of sheets. The filtration part 200 includes a first filtration layer 220 and a second filtration layer 230. The first filtration layer 220 and the second filtration layer 230 are assembled in a stacked or laminated form to form a filtration part. The circular lamination shown in FIG. 2 is only an exemplary example. The first filtration layer 220 and the second filtration layer 230 can be independently assembled to the filtration part 200. This means that users can selectively replace the first filtration layer 220 and/or the second filtration layer 230 as needed. The materials of the first filtration layer 220 and the second filtration layer 230 are the same as the materials of the first filtration layer 120 and the second filtration layer 130, respectively, so it will not be elaborated further for brevity's sake. As shown by the dashed line in FIG. 2, the filter of the second embodiment is configured to enable the unfiltered liquid enters the filtration part 200 from the top of the filtration part and then leaves the filtration part 200. Therefore, the second filtration layer 230 is closer to the unfiltered liquid than the first filtration layer 220.

Figure 3:
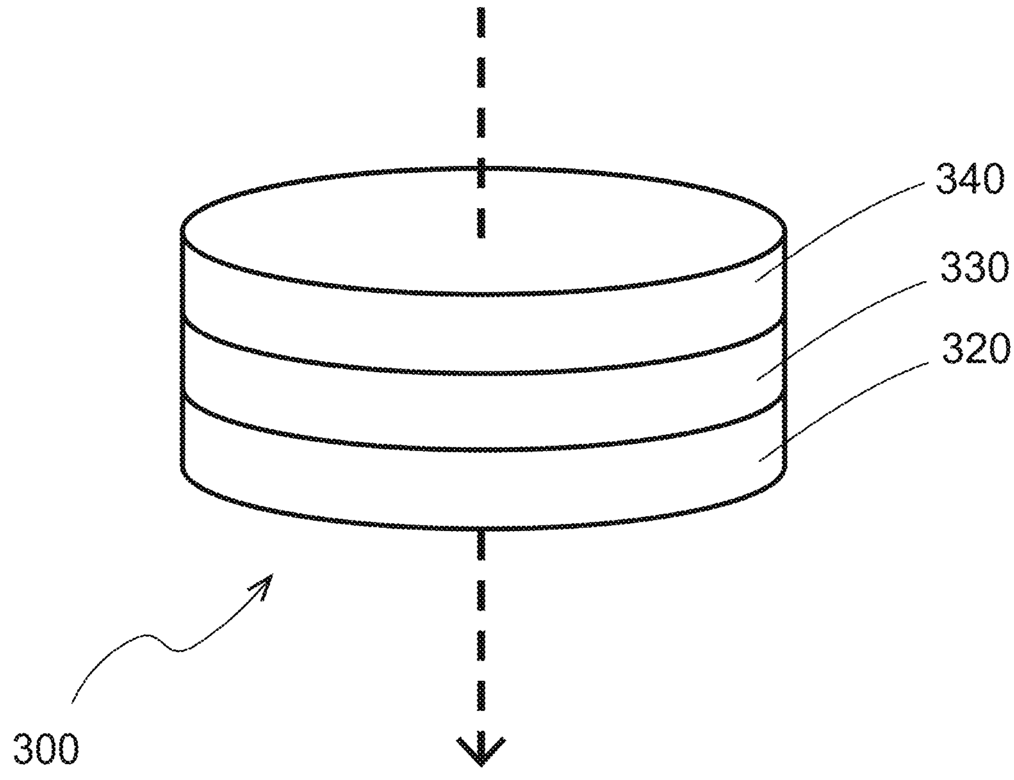
FIG. 3 is a perspective view of a filtering part according to an embodiment of the present invention.

FIG. 3 is a third embodiment of the filtration part of the filter of the present invention. The filtration part 300 shown in FIG. 3 also assumes in a form of sheet. The filtration part 300 includes a first filtration layer 320, a second filtration layer 330, and a third filtration layer 340. The first filtration layer 320, the second filtration layer 330, and the third filtration layer 340 are assembled in a stacked or laminated form to form a filtration part. The first filtration layer 320, the second filtration layer 330, and the third filtration layer 340 can be independently assembled to the filtration part 300. This means that users can selectively replace the first filtration layer 320 and/or the second filtration layer 330 and/or the third filtration layer 340 as needed. The materials of the first filtration layer 320 and the second filtration layer 330 are the same as the materials of the first filtration layer 120 and the second filtration layer 130, respectively, so it will not be elaborated further for brevity's sake. The materials of the third filtration layer 340 include non-woven fabric. According to actual needs, materials of non-woven fabric can be selected from polyethylene non-woven fabric, polypropylene non-woven fabric, spunbonded non-woven fabric, melt-brown non-woven fabric, or spunlaced non-woven fabric. The interweaving of non-woven fabric fibers makes the material porous. Therefore, according to the present invention, the third filtration layer 340 can be configured to filter plurality of sizes of impurities in the liquid, wherein the pore size of the third filtration layer 340 is larger than the pore size of the second filtration layer 330, and the pore size of the second filtration layer 330 is larger than the pore size of the first filtration layer 320. The above examples are only exemplary examples and should not be understood as limitations to the present invention. According to actual needs, in one embodiment, the pore size of the third filtration layer 340 is the same as the pore size of the second filtration layer 330 but larger than the pore size of the first filtration layer 320. According to actual needs, the examples of the materials of the first, second, and third filtration layers can be used as materials for other filtration layers. According to the filtration part 300 of the present invention, the pore size of the first filtration layer 320 is smaller than the pore size of the second filtration layer 330, and the pore size of the second filtration layer 330 is smaller than the pore size of the third filtration layer 340. As shown by the dashed line in FIG. 3, when implementing the third embodiment, the unfiltered liquid first contacts the third filtration layer 340 from the top of the filtration part for the first filtration, then contacts the second filtration layer 330 for the second filtration, and then contacts the first filtration layer 320 for the third filtration. The liquid after the third filtration then leaves the filtration part and enters the filtered liquid collector.

As explained in the first embodiment, the teachings in the embodiments in FIGS. 2 and 3 should not be understood as limitations to the present invention. According to actual needs, those skilled in the art could configure, according to the second and third embodiments of the present invention, the direction of the liquid flows into the filtration part such as entering from the right, from the left, or from the bottom. The spirit of the present invention lies in that, in the second embodiment, the unfiltered liquid first undergoes a first filtration in the second filtration layer 230, and then the liquid after the first filtration undergoes a second filtration in the first filtration layer 220. For the third embodiment, the unfiltered liquid first undergoes a first filtration in the third filtration layer 340, then the liquid after the first filtration undergoes a second filtration in the second filtration layer 330, and then the liquid after the second filtration undergoes a third filtration in the first filtration layer 320. Those skilled in the art should understand that the first filtration layer, second filtration layer, or third filtration layer described in the description is not formed by only one layer of material. According to actual needs, those skilled in the art could configure the filtration layer is formed by at least one layer of material. In one embodiment, the first filtration layer 320 may include 10 layers of nanofiber material layers made of nylon, the second filtration layer 330 may include at least 1 material layer made of activated carbon, and the third filtration layer 340 may include 10 material layers made of non-woven fabric. In one embodiment, the first filtration layer 320 includes 5 layers of nanofiber material layer made of nylon and 5 layers of nanofiber material layer made of polyurethane, the second filtration layer 330 may include at least 1 layer of material layer made of activated carbon, the third filtration layer 340 may include 5 material layers made of polypropylene non-woven fabric and 5 material layers made of spunlaced non-woven fabric.

Figure 4:
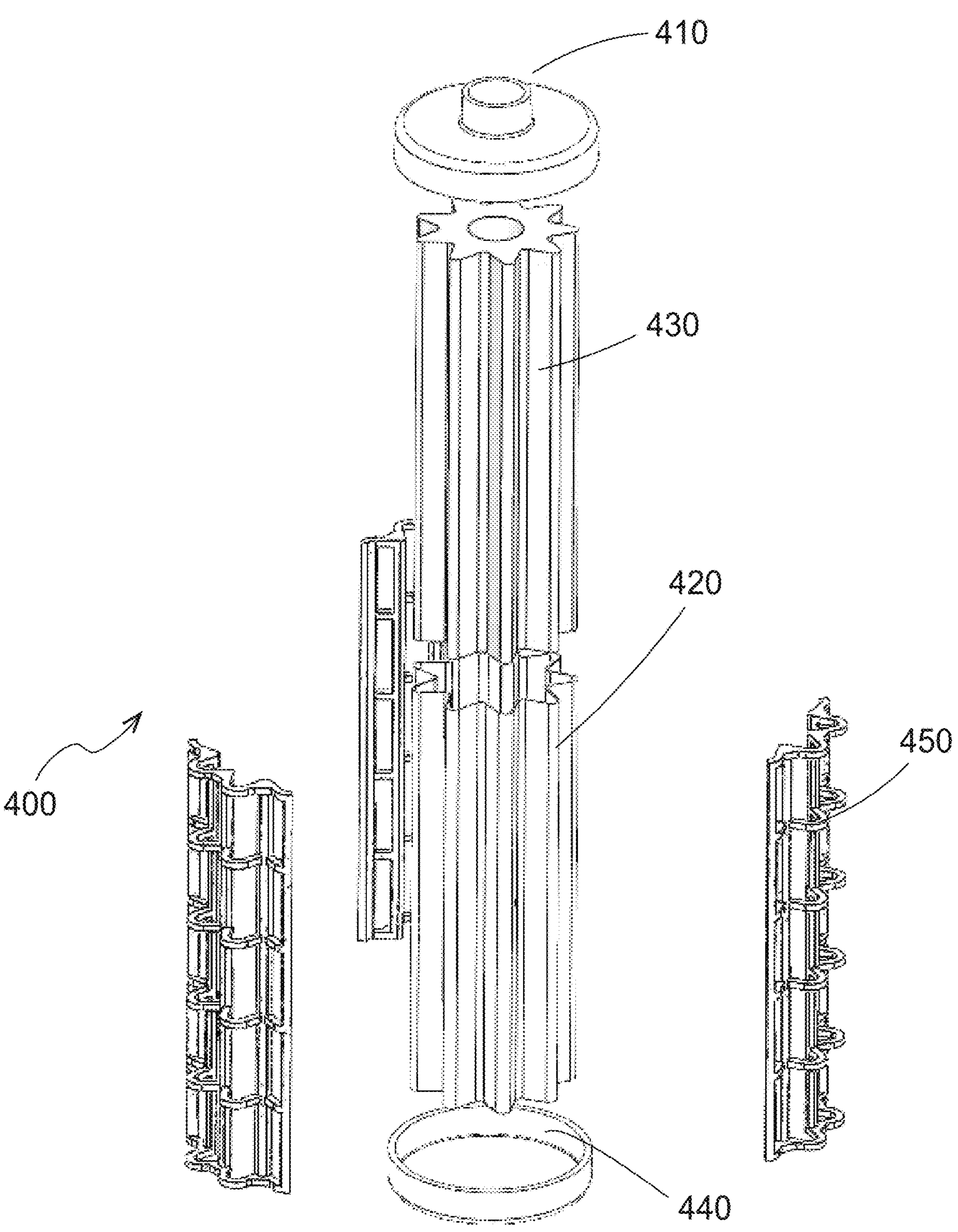
FIG. 4 is an exploded perspective view of a liquid filter according to an embodiment of the present invention.

FIG. 4 is a fourth embodiment of the filtration part of the filter of the present invention. The filtration part 400 shown in FIG. 4 is columnar or cylindrical in shape. The filtration part 400 has a water inlet 410, a first filtration layer 420, a second filtration layer 430, and a base member 440. The first filtration layer 420 and the second filtration layer 430 are arranged between the water inlet 410 and the base member 440. The materials of the first filtration layer 420 and the second filtration layer 430 are the same as that of the first filtration layer 120 and the second filtration layer 130, respectively, so it is not elaborated further for brevity's sake. Although the fourth embodiment does not have a third filtration layer of the present invention, those skilled in the art should understand that according to actual needs, the filter part 400 may also be provided with the third filter layer of the present invention circumferentially inside the central part of the second filter layer 430.

As shown in FIG. 4, the second filtration layer 430 is configured such that its central part forms a channel (as the channel 110 shown in in FIG. 1) of the filtration part of the present invention. However, FIG. 4 is only an exemplary example, and according to actual needs, the filter can be provided with another separate component as a channel for liquid flow.

In this embodiment, the second filtration layer 430 can be a prefabricated member with a geometric shape, preferably a rigid prefabricated member. As shown in FIG. 4, the top part of the second filtration layer 430 and its outer peripheral cylindrical shape is a nine-pointed star. However, the example shown in FIG. 4 shall not be understood as limitations to the present invention. According to actual needs, the geometric shapes of the cross-section of the second filtration layer can be star-shaped, polygon-shaped, or wave-shaped or other. In this embodiment, the first filtration layer 420 can be a flexible member, preferably a paper member. As shown in FIG. 4, the second filtration layer 430 has a shape of nine-pointed star which is similar to the outer cylindrical shape of the first filtration layer 420. The shapes of the first filtration layer 420 and the second filtration layer 430 can increase the surface area for filtration, improving the filtration efficiency and the filter lifespan. The formation of the shape of nine-pointed star of the first filtration layer 420 can be obtained by folding paper members or by placing the first filtration layer 420 in the space formed by the frame 450 and the second filtration layer 430 during assembling.

Figure 5:
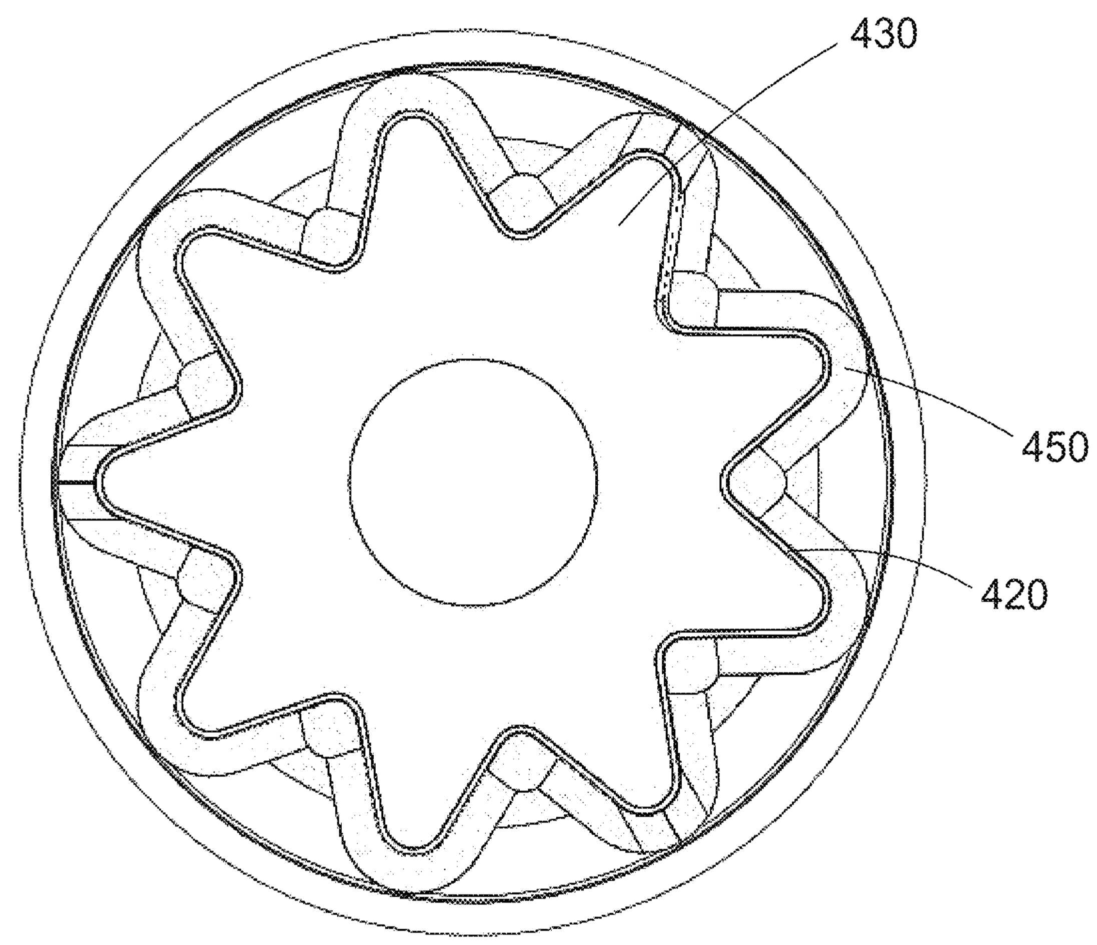
FIG. 5 is a top view of the embodiment of FIG. 4.
Figure 6:
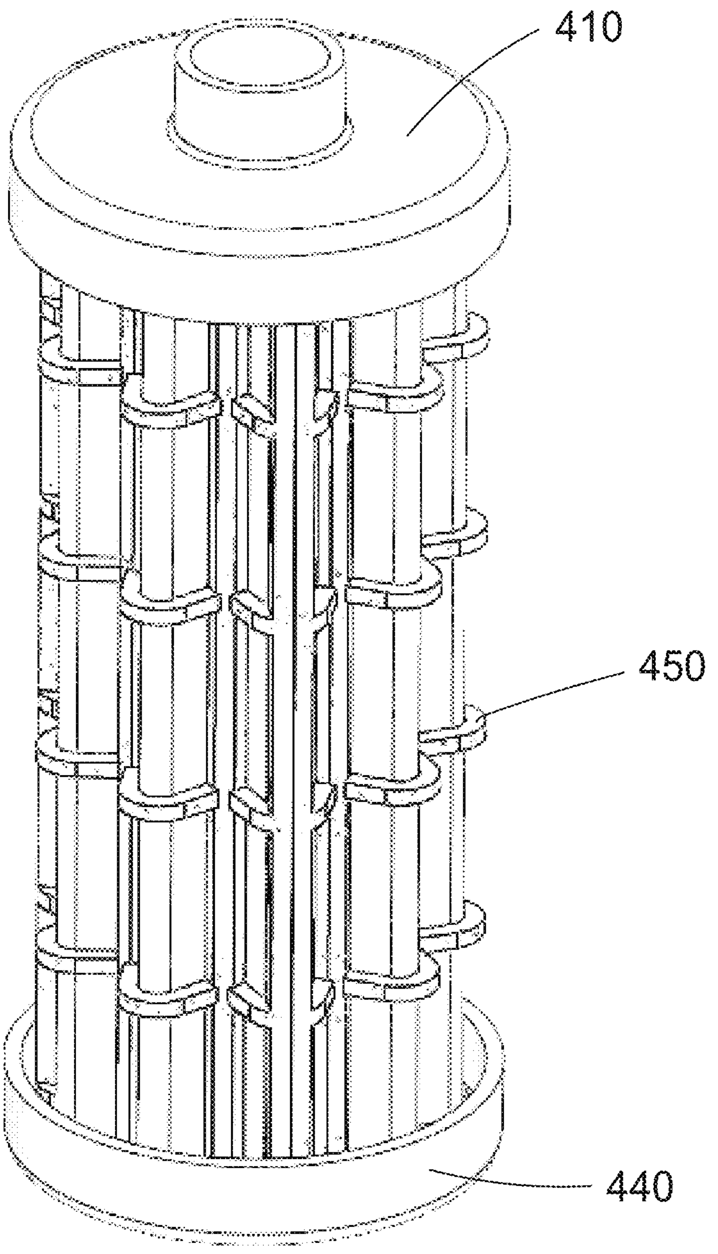
FIG. 6 is a schematic three-dimensional structural diagram of the embodiment in FIG. 4.

There are three frames 450 in FIGS. 4-6, which are arranged on the periphery of the first filtration layer 420 and surrounding the first filtration layer 420. However, due to actual needs, those skilled in the art could configure at least one frame 450. The arrangement of frame 450 is to provide convenience for assembling the first filtration layer, so that users do not need to fold the first filtration layer 420 in advance when placing the first filtration layer 420 into the filtration part of the present invention. Based on the narrow space formed by the frame 450 and the second filtration layer 430, the user press the non-folded first filtration layer 420 along the frame 450 against the periphery of the second filtration layer 430, so that after installation, the shape of the first filtration layer 420 will be the same as the cylindrical shape of the periphery of the second filtration layer 430, as shown in FIG. 5, which is a nine-pointed star shape. According to actual needs, the cross-sections of the frame 450 and the second filtration layer 430 can be any geometric shape, such as star-shaped, polygon-shaped, or wave-shaped, etc.

Inserts A-C in FIG. 7 are schematic diagrams of the fifth embodiment of the filtration part of the filter of the present invention, representing the assembly between the first filtration layer, the second filtration layer, and the frame. The filtration part or cylindrical liquid filter cartridge 500 shown in FIG. 7 assumes in cylindrical or tubular shape. The filtration part 500 has a water circular end cap inlet 510 including a port 505, a first filtration layer 520, a second filtration layer 530 with an interior surface thereof defining a central cylindrical channel 512, and frame 550. The configuration and operation of the water inlet 510, the first filtration layer 520, and the second filtration layer 530 are the same as those of the water inlet 410, the first filtration layer 420, and the second filtration layer 430, respectively, so it is not elaborated further for brevity's sake.

As shown in insert A in FIG. 7, a frame 550 of the filtration part 500 has a circular bottom part having a vertically extending peripheral wall and a plurality of branches or elongate frame members extending upwards along the length of the branches from the bottom part, wherein each of the plurality of branches has a first end directly engaging the vertically extending peripheral wall of the bottom part and a second end opposite to the first end having a notch portion 540 sized and shaped for engageable insertion within an interior of the circular end cap inlet 510. In some embodiments, the bottom part of the frame 550 can be the base member 440 in FIGS. 4-6. In this case, the plurality of branches can extend upwards from the base member. Preferably, as shown in FIG. 7, the upward extension of a plurality of branches is slightly away from the central axis of the circular bottom part, resulting in the second end of a plurality of branches is arranged to form an opening which is slightly larger than the bottom part, providing convenience for accommodating the first filtration layer 520, the second filtration layer 530, the frame 550, and the assembly therebetween. Further, preferably, the position of a plurality of branches in frame 500 corresponds to the geometric shape of the outer circumferential cross-section of the second filtration layer 530. As shown in in the inserts A and B in FIGS. 7, the first filtration layer 520 assumes a nine-pointed star shape, and the position of a plurality of branches in frame 550 corresponds to the recessed portion 525 of the nine-pointed star shape. Therefore, as shown in the insert B in FIGS. 7 and 8, a plurality of branches of frame 550 is accommodated in the recessed portion 525 of the outer wall of the second filtration layer 530.

The assembly of the filtration part 500 in the fifth embodiment can be achieved by following the steps below: gently wrapping the first filtration layer 520, preferably in the form of a flexible paper member, around the periphery of the second filtration layer 530 to form a first assembly. Then, as shown in insert B in FIG. 7, placing the second filtration layer 530 and the first filtration layer 520 which is lightly attached to the second filtration layer 530 together in a space formed by a plurality of branches of frame 500 to form the second assembly. After the second assembly (i.e., the first filtration layer 520 and the second filtration layer 530) is in the space, the user can gently press the plurality of branches of frame 500 with the fingers to press the first filtration layer 520 onto the recessed portion of the outer wall of the second filtration layer 530. Then, assembling the second assembly with a water inlet and a base member, wherein the second assembly is located between the water inlet and the base member, that is, the water inlet 510 is assembled to cover the second end of the frame 500 to form the state of the filtration part 500 in the insert C in FIG. 7 and FIG. 9.

Although the invention has been described in conjunction with specific embodiments of the invention, many alternatives, modifications and variations of these embodiments will be apparent to those of ordinary skill in the art from the foregoing description. The present embodiments are intended to embrace all such alternatives, modifications and variations that fall within the broad scope of the appended claims. Therefore, any omissions, modifications, equivalent substitutions, improvements, etc. made within the spirit and principles of the embodiments of the present invention shall be included in the protection scope of the present invention.

The invention claimed is:

1. A cylindrical liquid filter cartridge (500) comprising:

a first filtration layer (520) consisting of a first material;

a second filtration layer (530) consisting of a second material, the second filtration layer (530) having cross-sectional thickness with an outer circumferential cross-section defining a plurality of recessed portions (525) disposed around an elongate cylindrical perimeter, and an interior surface defining a central cylindrical channel (512), the first filtration layer (520) being coextensively laid over an outer peripheral surface of the elongate cylindrical perimeter of the second filtration layer (530), such that the shape of said first filtration layer after installation is the same as the peripheral shape of said second filtration layer;

a circular end cap inlet (510) having a port (505) in fluid communication with the central cylindrical channel (512) permitting fluid flow through the circular end cap inlet (510);

a circular base member (440) having a vertically extending peripheral wall radially disposed about a central axis; and a frame (550) including a plurality of elongate frame members each directly attached to the vertically extending peripheral wall of the circular base member (440) at a lower end of the filter cartridge (500), and each having a notch portion (540) at the opposing upper end that is sized and shaped for removable, engageable insertion within an interior of the circular end cap inlet (510);

wherein, each of the plurality of elongate frame members extend from the circular base member (440) through a respective one of the plurality of recessed portions (525), to the circular end cap inlet (510), when the respective notch portions (540) are insertably engaged within the interior of the circular end cap inlet (510), and at the opposing upper end of the frame (550), the plurality of elongate frame members are radially spaced from the central axis of the circular base member (440) defining an opening which is larger than an interior diameter of the frame (550) at the lower end of the filter cartridge (500), facilitating insertion the first filtration layer (520) and the second filtration layer (530) into an interior of the frame (550), when the respective notch portions (540) are not insertably engaged within the interior of the circular end cap inlet (510).

2. The cylindrical liquid filter cartridge according to claim 1, characterized in that the recessed portions of the outer circumferential cross-section of said second filtration layer define a first geometric shape.

3. The cylindrical liquid filter cartridge according to claim 2, characterized in that said first geometric shape is a star-shaped or wave-shaped polygon.

4. The cylindrical liquid filter cartridge according to claim 2, characterized in that an inner circumferential cross-section of said frame defines a second geometric shape, wherein, after said first filtration layer is arranged along the length of said elongate cylindrical perimeter, said first filtration layer is in contact with the periphery of said second filtration layer along the length of said frame, such that the cross-section of said first filtration layer assumes said first geometric shape and/or said second geometric shape.

5. The cylindrical liquid filter cartridge according to claim 4, characterized in that said second geometric shape is a star-shaped or wave-shaped polygon.

6. The cylindrical liquid filter cartridge according to claim 4, characterized in that said first geometric shape and said second geometric shape are the same.

7. The cylindrical liquid filter cartridge according to claim 1, characterized in that, a pore size of said first filtration layer is smaller than a pore size of said second filtration layer, such that liquid introduced through the port enters the central cylindrical channel, flows through the second filtration layer, and then through the first filtration layer, resulting in a filtered liquid.

8. The cylindrical liquid filter cartridge according to claim 1, characterized in that, said first material is nanofiber selected from the group consisting of: nylon, n-polyacrylonitrile, polyurethane, or the combinations thereof; and said second material is activated carbon.

9. The cylindrical liquid filter cartridge according to claim 1, characterized in that, said first filtration layer and said second filtration layer can be independently assembled.

* * * * *